(12) United States Patent
Hattori et al.

(10) Patent No.: US 7,175,924 B2
(45) Date of Patent: Feb. 13, 2007

(54) FINE FELDSPATHIC EARTHENWARE AND PROCESS OF MANUFACTURING THE SAME

(75) Inventors: Yoshiaki Hattori, Nomi-gun (JP); Toshiaki Ide, Nomi-gun (JP); Kazuya Mizumoto, Nomi-gun (JP)

(73) Assignee: Noritake Co., Limited, Nagoya (JP)

( * ) Notice: Subject to any disclaimer, the term of this patent is extended or adjusted under 35 U.S.C. 154(b) by 426 days.

(21) Appl. No.: 10/611,965

(22) Filed: Jul. 3, 2003

(65) Prior Publication Data

US 2004/0081858 A1    Apr. 29, 2004

(30) Foreign Application Priority Data

Jul. 6, 2002    (JP)    ............... 2002-232144

(51) Int. Cl.
*B32B 17/06*    (2006.01)

(52) U.S. Cl. ................................... 428/701

(58) Field of Classification Search ............... 428/701, 428/702, 697, 699, 446, 698, 156; 117/70
See application file for complete search history.

(56) References Cited

U.S. PATENT DOCUMENTS 3,628,989 A * 12/1971 Soimi .................. 428/325
3,922,458 A * 11/1975 Lynch .................. 428/210
4,229,494 A * 10/1980 Crandall et al. ............ 428/34.6
5,595,583 A *  1/1997 Murnick .................. 65/350
6,165,590 A * 12/2000 Takagi et al. ............... 428/152

FOREIGN PATENT DOCUMENTS

| JP | U 54-4263 | 1/1979 |
| JP | U 61-55037 | 4/1986 |
| JP | B2 4-8394 | 2/1992 |
| JP | A 11-217282 | 10/1999 |
| JP | A 2000-319061 | 11/2000 |
| JP | A 2001-206791 | 7/2001 |
| JP | A 2002-12469 | 1/2002 |

* cited by examiner

*Primary Examiner*—Jennifer C. McNeil
*Assistant Examiner*—Daniel Miller
(74) *Attorney, Agent, or Firm*—Oliff & Berridge, PLC

(57) ABSTRACT

A fine feldspathic earthenware including a body and a glaze layer covering surfaces of the body. The body has water absorption percentage of not lower than 3% and lower than 15% and includes an annular bottom formed on a bottom portion of the body. The glaze layer is absent on a surface of the annular bottom, and the surface of the annular bottom is covered with an annular vitrified layer which has substantially no water absorbing property. The vitrified layer is formed by coating the surface of the annular bottom with a composition having lower refractoriness than the body, and biscuit-firing the composition together with the body.

7 Claims, 6 Drawing Sheets

PRIOR ART

PRIOR ART

FIG. 7A
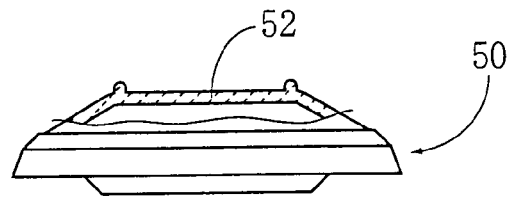
FIG. 7B
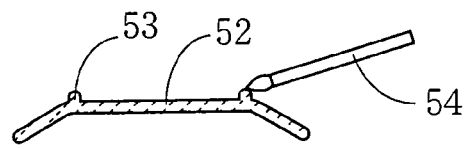
FIG. 7C
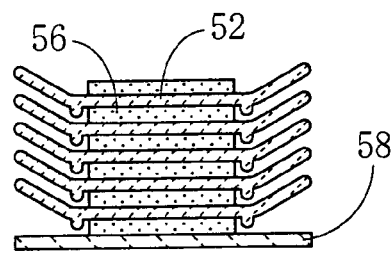
FIG. 7D
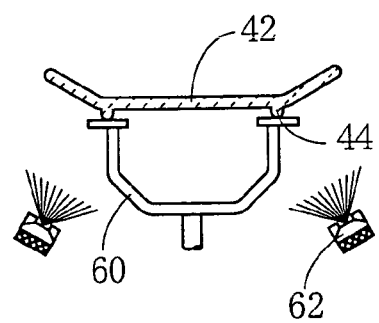
FIG. 7E
FIG. 7F
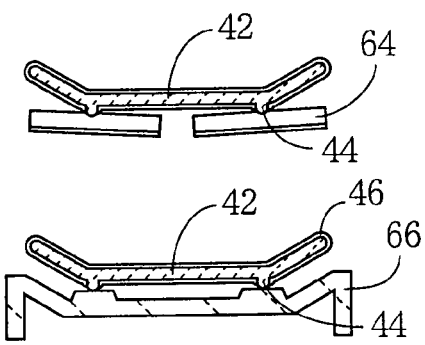
FIG. 7G
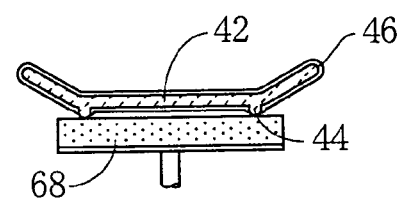

FINE FELDSPATHIC EARTHENWARE AND PROCESS OF MANUFACTURING THE SAME

This application is based on Japanese Patent Application No. 2002-232144 filed Jul. 6, 2002, the contents of which are incorporated hereinto by reference.

BACKGROUND OF THE INVENTION

1. Field of the Invention

The present invention relates to an improvement of a fine feldspathic earthenware (cream ware) used as a tableware in restaurants, hotels, and homes, and an improvement of a process of manufacturing such a fine feldspathic earthenware.

2. Discussion of Related Art

Potteries and ceramics (whiteware) are generally classified by their water absorption percentage, since the characteristics of the potteries and ceramic are well represented by the water absorption percentage of their internal body. The Ceramics Division of the American Ceramics Society defines nine or ten kinds of potteries including: majolica having water absorption percentage of not lower than 15%; a fine feldspathic earthenware having water absorption percentage of not lower than 3% and lower than 15%; and a stoneware having water absorption percentage of not lower than 0.1% and lower than 3%. The former version of JIS S3001-3003 (Japanese Industrial Standard) used a similar classification of the potteries according to the water absorption percentage.

In Japan, the potteries the bodies of which have water absorption percentage of 3–15% are referred to as "fine feldspathic earthenware (cream ware)", "feldspathic earthenware", "fine earthenware" or "semi-vitrified ceramics (earthenware)". In the United States, the United Kingdom and other European countries, those potteries are referred to as "earthenware" or "semi-vitreous china", for example. These potteries are usually or commonly used in restaurants, hotels and homes. Such potteries (hereinafter referred to simply as "fine feldspathic earthenware") have bodies whose surface is covered with a glaze layer, and have the following characteristics: (a) a high mechanical strength and high ease of handling, as well as a comparatively small weight owing to a specific gravity of about 2.0; (b) particularly high degrees of heat or thermal insulation and thermal shock resistance, owing to the formation of multiple pores in the body, and safe use for cooking with an electronic or gas oven; (c) a sufficiently high degree of whiteness even in the case of using a comparatively inexpensive material, owing to the firing at a temperature not so high as to achieve full vitrification in the process of manufacture; and (d) a high degree of durability without removal of a glaze color or pigment, owing to a hard glaze layer covering the surface of the body, in the absence of an overglaze decoration, with only an underglaze decoration given on the body surface.

Referring to the schematic views of FIGS. 1A–1E in cross section illustrating major process steps of manufacturing a fine feldspathic earthenware in the prior art, the process steps include a step of placing a body on a so-called rollerhead machine 10 equipped with a gypsum mold, and press-forming the body into a plate-like or dish-like body. FIG. 1A shows this step. The thus formed bodies 12 each in the form of a plate or dish are dried for a sufficient time, and are then biscuit-fired at a temperature of about 1100–1300° C. in a kiln such that the formed bodies 12 are superposed on each other in a stack on a setter 14. FIG. 1B shows this step. Successively, each biscuit-fired body 16 is given an underglaze decoration, which is transferred from a transfer paper bonded to its surface or drawn with a suitable powdered pigment. Then, the biscuit-fired body 16 is supported by pins 18 at a plurality of positions (e.g., three positions) on its back surface, and the surfaces of the body 16 are uniformly coated with a glaze, with spray guns or sprayers 20. FIG. 1 C shows this step. After the body 16 coated with the glaze is sufficiently dried, the body 16 is subjected to a glost firing operation, with a refractory jig 22 as described in JP-U-54-4263. For example, this jig 22 is a generally annular structure having a plurality of projections 24 (e.g., three prismatic pins each in the form of a triangular prism having a length of a several tens of millimeter and three faces each having a width of several millimeters). The projections 24 protrude inwardly of the annular structure of the jig 22. The biscuit-fired body 16 is supported by the jig 22, with the projections 24 held in abutting contact with the back surface of the body 16. In this condition, the body 16 is glost-fired at a temperature of about 900–1200° C. FIG. 1D shows this step. Subsequently, the glost-fired fine feldspathic earthenware 26 is separated from the projections 24 of the jig 22. Usually, fragments 28 of the projections 24 adhere to the earthenware 26 as a result of a reaction of the projections 24 with the glaze. These fragments 28 are removed with a grinding wheel 30 which carry a grinding layer formed of abrasives of diamond, silicon carbide or corundum. FIG. 1E shows this step. Thus, the fine feldspathic earthenware 26 is manufactured.

2A and 2B show in detail the step of removing the fragments 28 of the projections 24 which remain adhering to the fine feldspathic earthenware as a result of the reaction of the projections 24 with the glaze in the glost-firing step, after the glost-fired fine feldspathic earthenware 26 is removed from the projections 24 of the jig 22 described above. FIG. 2A shows the earthenware 26 before removal of the fragments 28, while FIG. 2B shows the earthenware 26 after the removal. The bottom plan view of FIG. 3 shows the fine feldspathic earthenware 26 after the removal of the fragments 28. FIG. 2B is a cross sectional view taken along line 2—2 of FIG. 3. As shown in FIGS. 2A, 2B and 3, the fine feldspathic earthenware 26 manufactured in the prior art process inevitably suffers from pin marks 32 caused by the pins 18 used to support the biscuit-fired body 16 in the glaze coating step, and ground spots 34 caused by the removal of the fragments 28 of the jig 22. These pin marks 32 and ground spots 34 have non-glazed surface areas which are not coated with the glaze and which have a relatively high water absorption percentage. In particular, the ground spots 34 have a comparatively large diameter of about 2–5 mm, and accordingly give rise to various problems.

Described in detail, the fine feldspathic earthenware whose body has a relatively high water absorption percentage is ideally covered over its entire surface with the glaze layer. Namely, the body of the fine feldspathic earthenware is likely to absorb contaminated liquids or particulate matters, at its exposed non-glazed areas, and these liquids and particulate matters tend to stay in the pores existing adjacent to the surfaces of the exposed non-glazed areas. Accordingly, the contaminated non-glazed areas are unfavorably contrasted with the other area of the body or the glazed area, which is transparent, or white- or otherwise-colored uniformly. Thus, the contaminated non-glazed areas highly possibly degrade the appearance of the earthenware. In addition, particles are produced when the fragments 28 of the projections 24 of the jig 22 are removed by the grinding wheel 30 after the fine feldspathic earthenware 26 is separated from the jig 22. Since the particles may adhere to the other pieces of earthenware 26 under manufacture together with the piece in question, the individual pieces of earthenware 26 under manufacture must be isolated from each other, to prevent the adhesion of the particles produced in the grinding operation. Further, the grinding operation which must be performed manually inevitably increases the cost of manufacture of the earthenware 26 and lowers the efficiency of the manufacture, and may damage the earthenware 26 to a commercially unacceptable extent, due to an error in the manual grinding operation. The fragments 28 remain on the fine feldspathic earthenware 26 immediately after the removal from the kiln after the glost-firing operation, may have a risk of injuring the fingers or other parts of the worker, when those parts contact sharp edges of the fragments 28.

The pin marks 32 are comparatively small, and are not highly perceptible while the fine feldspathic earthenware 26 is still new. As the earthenware 26 is aged, however, exposed non-glazed areas provided by the pin marks 32 are gradually contaminated and contrasted with the adjacent glazed, colored areas, and unfavorably degrade the appearance, like the ground spots 34. Further, the non-glazed areas of the pin marks 32 have a higher surface roughness, than the glazed area, and may mar the upper surface of the underlying piece of earthenware 26, when the pieces are stacked for transportation. In addition, the pin marks 32 may be a source of cracking or breakage of the earthenware 26.

SUMMARY OF THE INVENTION

The present invention was made in view of the background art discussed above. It is a first object of the present invention to provide a fine feldspathic earthenware having a body which has a high water absorption percentage but does not have exposed surface areas through which contaminated liquids or particulate matters are easily absorbed. A second object of the invention is to provide a process of manufacturing such a fine feldspathic earthenware.

It is noted that where the body of a glost-fired pottery has water absorption percentage of not lower than 3%, exposed non-glazed surface areas of the body which are produced for some reason or other during the manufacture of an earthenware have a similar water absorption percentage, and the body of the earthenware rapidly absorbs water through the non-glazed areas by a capillary phenomenon, when the body comes into contact with the water during use of the earthenware. The water thus absorbed in the body causes various problems: cracking of the earthenware in the form of sanitary wares or tiles used outdoors, due to expansion of the water in the winter season; and cracking or breakage of the earthenware due to expansion by hydration in the presence of carbon dioxide (carbonic acid gas) contained in the moisture in the atmosphere or rain drops. JP-A-2001-206791 and JP-A-2000-319061 disclose techniques for preventing such problems with sanitary wares, by impregnating exposed non-glazed portions of the body of the ware (having some degree of water absorbing property) with an alkali metal or an alkaline-earth metal, so that those non-glazed portions of the body are sintered with a higher density in the firing step, and accordingly have a lower water absorption percentage. JP-B2-4-8394 discloses a technique for preventing the problems with tiles in the winter season, by suitably adjusting a distribution of pores in the exposed non-glazed portions of the body. On the other hand, the present inventors considered partial vitrification of a portion of a body of a fine feldspathic earthenware, in an attempt to solve the above-described problems with the fine feldspathic earthenware.

The first object may be achieved according to a first aspect of this invention, which provides a fine feldspathic earthenware comprising a body and a glaze layer covering surfaces of the body, the body having water absorption percentage of not lower than 3% and lower than 15% and including an annular bottom formed on a bottom portion of the body, the fine feldspathic earthenware being characterized in that the glaze layer is absent on a surface of the annular bottom, and in that the surface of the annular bottom is covered with an annular vitrified layer which has substantially no water absorbing property.

In the fine feldspathic earthenware of the present invention constructed as described above, the annular vitrified layer is formed on the surface of the annular bottom, so that it is not necessary to form a glaze layer on the surface of the annular vitrified layer. Therefore, the annular bottom will not be fused to a refractory setter when a precursor of the body is glost-fired into the body while the precursor of the body is held in direct contact with the setter, at a precursor of the annular bottom. Accordingly, the precursor of the body need not be supported by a suitable jig, at its portion covered by the glaze layer, so that the body would not have non-glazed areas due to contact of the glazed area of the body with the jig. Since the vitrified layer has substantially no water absorbing property, contaminated liquids or particular matters will not be absorbed into the body through the vitrified layer. In the fine feldspathic earthenware, the body which has a high water absorption percentage does not have exposed surface areas through which contaminated liquids or particular matters are easily absorbed.

According to a first preferred form of the fine feldspathic earthenware of the invention, the annular vitrified layer has a radially inner end portion and a radially outer end portion which are covered with the glaze layer. This arrangement assures complete prevention of the body from absorbing the contaminated liquids or particular matters through the annular bottom.

According to a second preferred form of the fine feldspathic earthenware of the invention, the annular vitrified layer is formed of a composition which has a lower degree of refractoriness than the body and which is vitrified when the body is biscuit-fired. In this case, the annular vitrified layer is formed so as to have no water absorbing property, when the body is biscuit-fired. Thus, the surface of the annular bottom is covered by the annular vitrified layer having substantially no water absorbing property, when the body is subjected to the biscuit-firing operation.

According to a third preferred form the fine feldspathic earthenware of the present invention, the annular vitrified layer is formed of a composition including a specific component which is vitrified at a temperature within a range of 1100–1300° C. In this case, the specific component contained in the composition is vitrified upon biscuit-firing of the body, and this component is bonded to the other components having higher degrees of refractoriness, so that the vitrified layer has substantially no water absorbing property.

According to a fourth preferred form of the fine feldspathic earthenware of the invention, the annular vitrified layer has a thickness of not smaller than 1 µm and smaller than 0.5 mm. In this case, the thickness of the annular vitrified layer is not excessively large but is sufficient to permit the vitrified layer to prevent contaminated liquids or particular matters from being absorbed into the body through the vitrified layer. If the thickness is smaller than 1

μm, the contaminated liquids or particular matters may be absorbed into the body through the annular vitrified layer. If the thickness is 0.5 mm or larger, it is relatively difficult to form the vitrified layer on the annular bottom, and the vitrified layer may suffer from peeling or cracking due to a difference in composition between the body and the vitrified layer.

According to a fifth preferred form of the fine feldspathic earthenware of this invention, a difference between average coefficients of thermal expansion of the body and the annular vitrified layer is within a range of $\pm 3 \times 10^{-6}$, for example, the body has an average coefficient of thermal expansion which is higher than that of the annular vitrified layer by a maximum amount of $+3 \times 10^{-6}$. In this instance, the residual stress in the fine feldspathic earthenware due to a difference in the average coefficient of thermal expansion between the body and the vitrified layer is significantly reduced, advantageously resulting in an accordingly reduced risk of peeling and cracking of the vitrified layer due to the residual stress.

According to a sixth preferred form of the fine feldspathic earthenware of the present invention, the annular vitrified layer is formed from a composition including 45–80% by weight of $SiO_2$, 10–40% by weight of $Al_2O_3$, and a total 3–15% by weight of $K_2O$ and $Na_2O$.

The fine feldspathic earthenware of this invention is suitably used as a tableware. Namely, the present invention provides a tableware the body of which has a high water absorption percentage but does not have exposed surface areas through which contaminated liquids or particular matters are easily absorbed.

The second object indicated above may be achieved according to a second aspect of the present invention, which provides a process of manufacturing a fine feldspathic earthenware comprising a body and a glaze layer covering surfaces of the body, the body having water absorption percentage of not lower than 3% and lower than 15% and including an annular bottom formed on a bottom portion of the body, the process comprising: a forming step of forming a precursor of the body such that the precursor of the body has a precursor of the annular bottom;

a coating step of coating a surface of the precursor of the annular bottom with a composition having a lower degree of refractoriness than that of the precursor of the body; and a biscuit-firing step of biscuit-firing the precursor of the body with the composition covering the surface of the precursor of the annular bottom, whereby the body is formed with the annular bottom the surface of which is covered with an annular vitrified layer formed of the composition.

In the process of manufacturing the fine feldspathic earthenware according to the second aspect of the invention, the surface of the precursor of the annular bottom is coated with a composition having a lower degree of refractoriness than that of the precursor of the body, and the precursor of the body is biscuit-fired with the composition covering the surface of the precursor of the annular bottom, so that the body is formed with the annular bottom the surface of which is covered with an annular vitrified layer which is formed of the composition and which has substantially no water absorbing property. Accordingly, it is not necessary to form a glaze layer on the surface of the annular vitrified layer. Therefore, the annular bottom will not be fused to a refractory setter when the precursor of the body is glost-fired into the body while the precursor of the body is held in direct contact with the setter, at a precursor of the annular bottom. Accordingly, the precursor of the body need not be supported by a suitable jig, at its portion covered by the glaze layer, so that the body would not have non-glazed areas due to contact of the glazed area of the body with the jig. Since the vitrified layer has substantially no water absorbing property, contaminated liquids or particular matters will not be absorbed into the body through the vitrified layer. Thus, the present process makes it possible to manufacture a fine feldspathic earthenware the body of which has a high water absorption percentage but does not have exposed surface areas through which contaminated liquids or particular matters are easily absorbed.

In one preferred form of the second aspect of this invention, the process further comprises a step of positioning a plurality of pieces of the precursor of the body in a stack such that adjacent ones of those pieces are spaced apart from each other by a refractory setter. In this case, the pieces positioned in the stack can be concurrently biscuit-fired in the biscuit-firing step.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which:

FIGS. 7A–7G are schematic views in cross section showing major steps of the process of FIG. 7.

DETAILED DESCRIPTION OF THE PREFERRED EMBODIMENTS

Referring to the accompanying drawings, one embodiment of this invention will be described in detail.

Figure 1A:
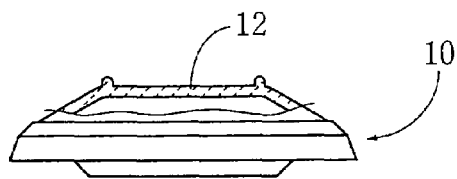
FIGS. 1A–1E are schematic views in cross section schematically illustrating major process steps implemented in the prior art to manufacture a fine feldspathic earthenware.
Figure 1B:
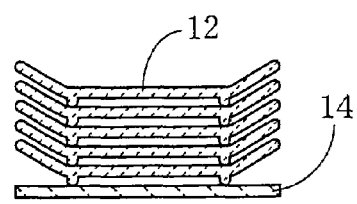
Figure 1C:
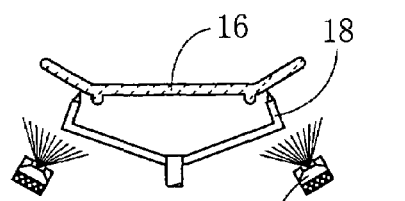
Figure 1D:
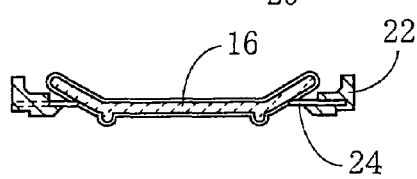
Figure 1E:
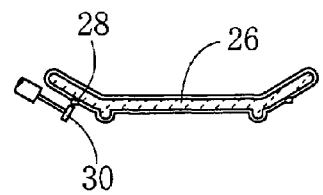
Figure 2A:
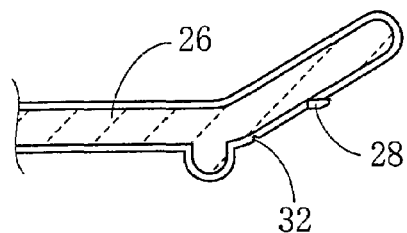
FIGS. 2A and 2B are fragmentary views in cross section showing in detail a step of removing protruding fragments which are fixed to the fine feldspathic earthenware as a result of a reaction of the fragments with a glaze in a glost-firing step in the prior art of FIGS. 1A–1E, FIG. 2A showing the earthenware before removal of the fragments, while FIG. 2B showing the earthenware after the removal.
Figure 2B:
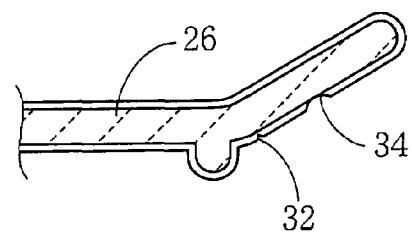
Figure 3:
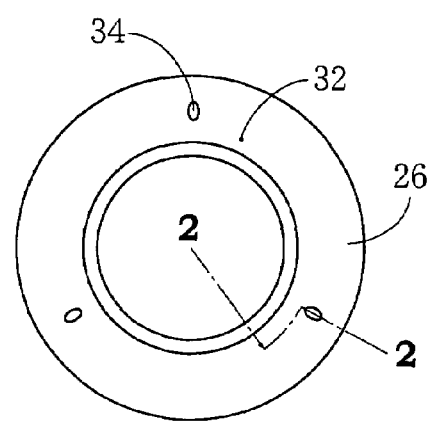
FIG. 3 is a bottom plan view showing the fine feldspathic earthenware after the removal of the fragments.
Figure 4:
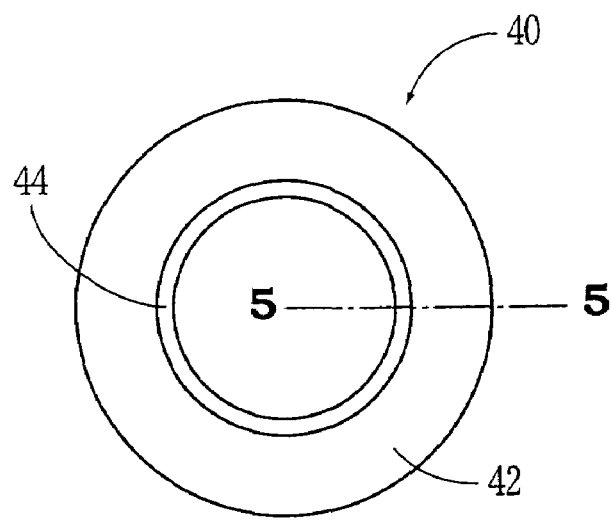
FIG. 4 is a bottom plan view showing a fine feldspathic earthenware 40 according to one embodiment of the present invention.
Figure 5:
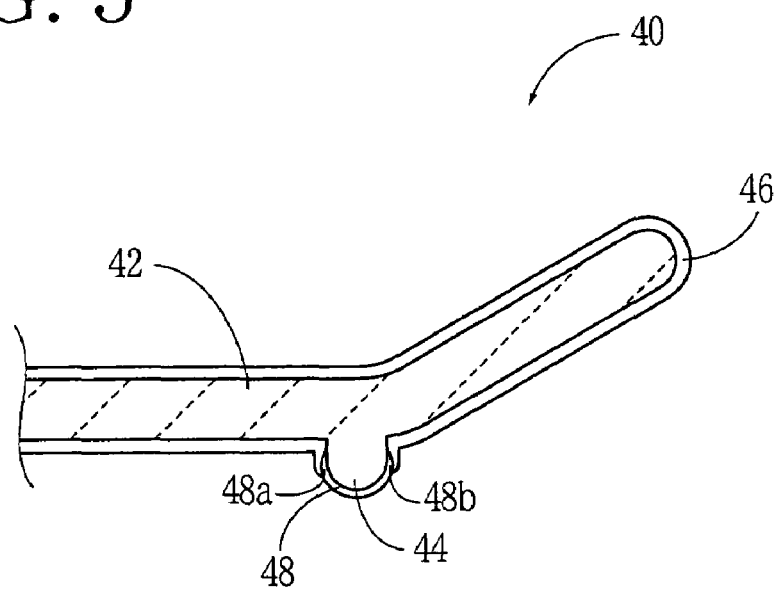
FIG. 5 is a fragmentary cross sectional view of the earthenware 40 taken along line 5—5 of FIG. 4.

Referring first to the bottom plan view of FIG. 4 and the fragmentary view of FIG. 5 in cross section taken along line 5—5 of FIG. 4, there is shown a fine feldspathic earthenware (cream ware) 40 according to one preferred embodiment of the present invention. As shown in FIGS. 4 and 5, the fine feldspathic earthenware 40 is a dish having an outside diameter of about 170 mm and a height of about 20 mm, and has a comparatively large bottom portion. For example, this dish is used as a tableware. The fine feldspathic earthenware 40 includes a body 42 the body portion of which has an annular bottom 44 having an inside diameter of about 90 mm, an outside diameter of about 100 mm and a height of about 3 mm. All surfaces of the body 42 are covered with a glaze layer 46, except an annular portion of the back surface which corresponds to the annular bottom 44. Namely, the glaze layer 46 is absent on a surface of the annular bottom 44 which has an almost semicircular shape in transverse cross section as shown in FIG. 5. The annular bottom 44 has an annular ridge having a diameter which is intermediate between the inside and outside diameters of the annular bottom 44. The surface of the annular bottom 44 which is not covered with the glaze layer 46 is covered with an annular vitrified layer 48 which has a lower water absorption percentage.

The body 42 of the fine feldspathic earthenware 40 is formed of a composition which includes, as major components, silica ($SiO_2$), alumina ($Al_2O_3$), potassium oxide ($K_2O$) and sodium oxide ($Na_2O$), and other additives as needed, such as calcia (CaO) and magnesia (MgO). For example, the composition of the body 42 includes about 60–75% by weight of silica, about 15–25% of alumina, a total of about 2–5% by weight of sodium oxide and potassium oxide. To improve specific properties, for example, sinterability and formability of the composition, the composition may include desired additives such as calcium, magnesium and lithium oxides. The body 42 having the composition described above has a porous structure having a multiplicity of pores and a water absorption percentage of not lower than 3% and lower than 15%. To confirm that the body 42 has a water absorption percentage within this specified range, the water absorption percentage of the body 42 is measured according to JIS R2205 which defines methods of measuring apparent porosity, water absorption percentage and specific gravity of refractory bricks.

Where the body 42 has a water absorption percentage within a range of about 5–10%, the fine feldspathic earthenware 40 has a high mechanical strength, a high fracture strength, and a comparatively high yield ratio, and is more commonly used in recent years, than other potteries or whitewares which have substantially no water absorbing property. An investigation of the above-described body 42 with an X-ray deffractometer reveals a strong appearance of diffraction lines of mineral crystals such as quartz, cristobalite and mullite, and indicates that a multiplicity of these crystals are present in the body 42. Further, an observation of fragments of the body 42 with a microscope reveals a microstructure wherein the multiplicity of the above-indicated crystals present in the fragments have sizes ranging from several to several tens of microns (μm). A comparatively large number of pores formed in the fragments, which contribute to the water absorbing property of the body 42, are represented by black or dark points observed with the microscope such that the dark points are uniformly or evenly distributed over the entire portion of each fragment. Those pores are not formed independent of each other, but are communicated with each other. In this sense, the pores are considered to be a multiplicity of relatively elongate tunnels or passages having different diameters (several microns). The observation with the microscope further reveals production of a small amount of a glass component surrounding or adjacent to the above-indicated crystals. A glassy nature of this glass component can be easily observed with a polarizing microscope.

On the other hand, the vitrified layer 48 is formed by applying a coating of a composition having a lower refractoriness than that of the body 42, to the annular surface of the annular bottom 44, which annular surface has a semicircular shape in transverse cross section as shown in FIG. 5. The coating is biscuit-fired into the vitrified layer 48 when a precursor of the body 42 is biscuit-fired into the body 42. The thus biscuit-fired coating has a larger content of the glass component than the body 42, and is sufficiently vitrified into the annular vitrified layer 48 having substantially no water absorbing property. While the thickness of the vitrified layer 48 is not particularly limited, the vitrified layer 48 has poor durability and reproducibility, in particular, an insufficient resistance to permeation of contaminated liquids or particulate matters, when the thickness of the vitrified layer 48 is extremely small. In this respect, the vitrified layer 48 preferably has a thickness of at least 1 μm, more preferably at least 5 μm, and most preferably at least 20 μm. Further, the vitrified layer 48 having an extremely large thickness may not only degrade the appearance of the bottom portion and deteriorate an aesthetic value of the fine feldspathic earthenware 40, but also increase a residual stress in the annular bottom 44 due to a relatively large difference in an average coefficient of thermal expansion between the body 42 and the vitrified layer 48. An increase in the residual stress of the annular bottom 44 may result in an increased possibility of cracking of the glaze layer 46. In this respect, the maximum thickness of the vitrified layer 48 is preferably 0.5 mm, more preferably 0.3 mm, and most preferably 0.2 mm. In the present embodiment, radially inner and outer end portions 48$a$ and 48$b$ of the vitrified layer 48 are covered with the glaze layer 46, as shown in FIG. 5. That is, the semicircular surface of the annular vitrified layer 48 as seen in FIG. 5 has opposite end portions 48$a$, 48$b$ covered with the glaze layer 46.

Preferably, the body 42 has a refractoriness value within a range of SK20–30, a mechanical strength within a range of about 500–1000 kg/cm$^2$, and an average coefficient of thermal expansion within a range between about $5.5 \times 10^{-5}$ and about $8.5 \times 10^{-6}$. The vitrified layer 48 is preferably formed of a composition including a component which is vitrified at a temperature within a range of 1100–1300° C., so that the refractoriness of the vitrified layer 48 is made lower than that of the body 42. For instance, the vitrified layer 48 preferably has a refractoriness value of about SK1a–10. Preferably, the difference between the average coefficients of thermal expansion of the body 42 and the vitrified layer 48 is held within a range of $\pm 3 \times 10^{-6}$. If this difference exceeds $\pm 3 \times 10^{-6}$, the vitrified layer 48 may suffer from cracking or peeling or removal from the annular bottom 44, which causes the annular bottom 44 to be exposed to the atmosphere. More preferably, the difference in the average coefficient of thermal expansion between the body 42 and the vitrified layer 48 is held within a range of $\pm 2 \times 10^{-6}$. More preferably, the difference is held within a range of $\pm 1.5 \times 10^{-6}$. That is, the average coefficient of thermal expansion of the body 42 is higher than that of the annular vitrified layer 48 by a maximum amount of preferably $\pm 3 \times 10^{-6}$, more preferably $\pm 2 \times 10^{-6}$, and most preferably $\pm 1.5 \times 10^{-6}$.

Figure 6:
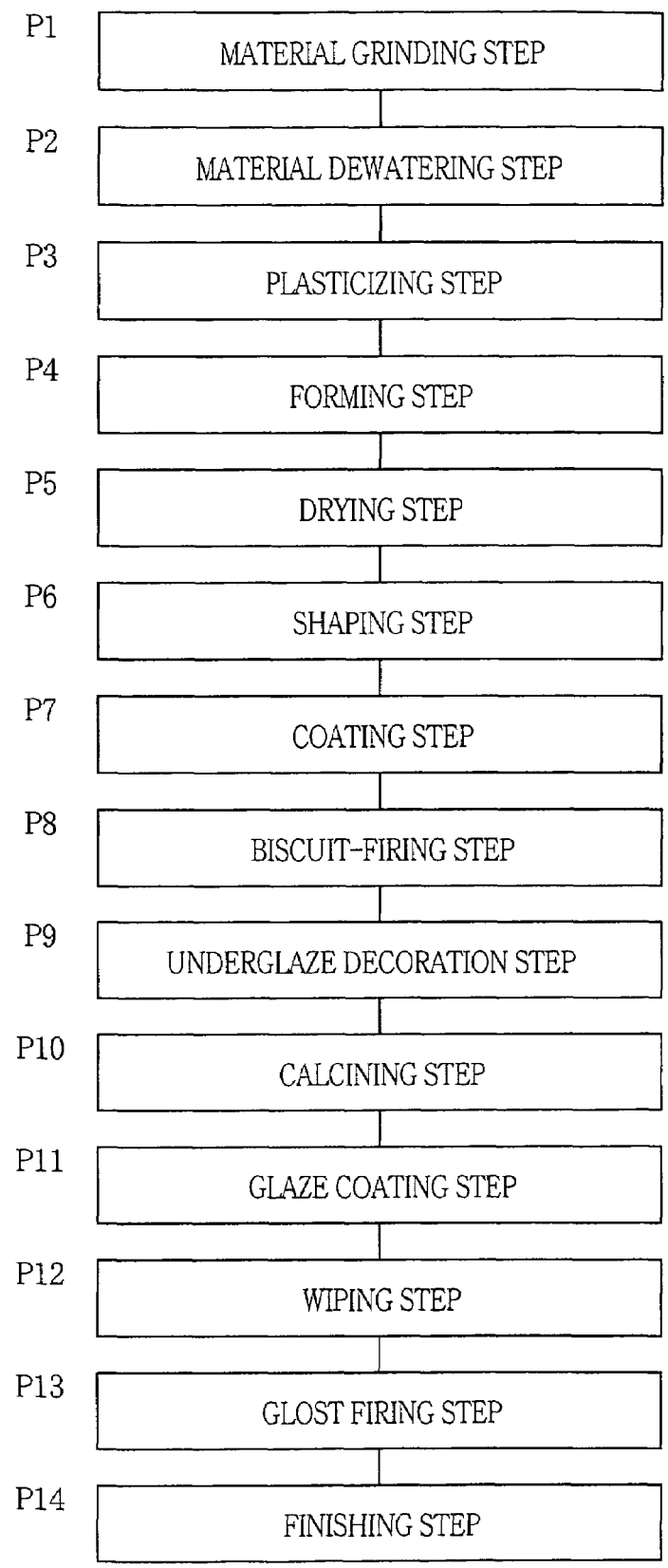
FIG. 6 is a flow chart illustrating a process of manufacturing the fine feldspathic earthenware of the embodiment.

There will next be described an example of a process of manufacturing the fine feldspathic earthenware 40 constructed as described above. The flow chart of FIG. 6 illustrates one example of the process according to the present invention, while the schematic views of FIGS. 7A–7G show major steps implemented in the process. The process is initiated with material grinding step P1 in which a selected starting material for the body 42 is mechanically wet-ground. The starting material is preferably selected from natural materials such as ordinary pottery stone, gairome clay, kibushi clay, kaoline, siliceous stone (silica stone) and feldspar. Suitable additives such as roseki (agalmatolite), talc, limestone and doromite may be added as components of the starting material, as needed. It is desired to increase the contents of the components such as kaoline and aluminous shale that have relatively high alumina contents and relatively high degrees of refractoriness, with an increase in the temperature at which biscuit-firing step P8 (which will be described) is implemented. Preferably, the starting material consists of about 45–60% by weight of a clay material, about 15–40% by weight of siliceous stone and about 5–20% by weight of feldspar. The starting material is adjusted to a desired proportion by weight of the components, and is introduced into a ball mill charged with water and grinding balls. The starting material is wet-ground for about 8–24 hours into fine particles, so that the wet-ground starting material in the form of a slurry has an average particle size of about 5–10 μm.

The wet-ground starting material in the form of a slurry obtained in the material grinding step P1 described above is dewatered or dehydrated in the following material dewatering step P2, so that the water content of the slurry is reduced to a predetermined value. This dewatering sep P2 is required particularly where the starting material is formed by throwing on a rollerhead machine in forming step P4 which will be described. In the dewatering step P2, the slurry is introduced into a filter press, to remove an excess amount of water from the slurry so that the water content of the slurry is reduced to a value suitable for forming the slurry into a desired shape, for instance, to 20–24%. The starting material dewatered to the desired water content in the dewatering step P2 is sufficiently plasticized in plasticizing step P3, and the plasticized material is introduced into a gypsum mold of a so-called rollerhead machine 50, wherein the material is press-formed into a dish-shaped mass, that is, a formed body 52, which is a precursor of the body 42 of the fine feldspathic earthenware 40. FIG. 7A shows this formed body 52 formed by the rollerhead machine 50. The starting material may be formed in the forming step P4, by introducing into a gypsum mold the starting material in the form of a slurry as obtained in the material grinding step P1, rather than by forming the dewatered and plasticized material on the rollerhead machine 50. In this case, any technique known in the art for forming a pottery having an annular bottom like the annular bottom 44 may be practiced using a suitable gypsum mold having a portion for the annular bottom of the pottery. Where the starting material in the form of a slurry having a comparatively high water content is formed with such a gypsum mold in the forming step P4, the starting material need not be dewatered, and the material dewatering step P2 and the plasticizing step P3 are not essential.

The formed body 52 (precursor of the body 42) obtained in the forming step P4 has a precursor 53 of the annular bottom 44. This formed body 52 is suitably dried in drying step P5, and is then shaped in shaping step P6, by a grinding operation, for example. In the following coating step P7, the surface of the precursor 53 of the dried and shaped body 52 is coated with a suitably prepared composition having a lower degree of refractoriness than that of the precursor 52 of the body 42. The composition is applied to the surface of the precursor 53, by using a brush 54, for instance, as shown in FIG. 7B. However, the surface of the precursor 53 may be coated with the composition, by immersing the extreme end portion of the precursor 53 in a solution of the composition, or by applying the composition to the precursor 53 with a sponge or a spray gun. While the composition is not particularly limited, the composition preferably includes 45–80% by weight of $SiO_2$, 10–40% by weight of $Al_2O_3$, and a total of 3–15% by weight of $K_2O$ and $Na_2O$ In the coating step P7, the surface of the precursor 53 of the annular bottom 44 of the formed body 52 is preferably coated with a thin layer of a prepared slurry including fine particles of natural mineral components (raw materials) including silica and alumina as major components, such as clay, pottery stone and feldspar, which are dispersed in a suitable liquid such as water. To increase adhesion of the vitrified layer 48 to the annular bottom 44, it is desirable to add to the slurry small amounts of inorganic binders such as water glass and bentonite, or PVA, MC, CMC and acrylic acid polymer. Preferably, the slurry includes pottery stone and clay as major components, which have lower degrees of refractoriness than the formed body 52 (precursor of the body 42) and which are fully vitrified at a temperature at which the formed body 52 is biscuit-fired in the following biscuit-firing step P8. Described in detail, the formed body 52 and the mineral components of the slurry (composition for the vitrified layer 48) are required to have a difference in refractoriness, which corresponds at least 50° C., preferably about 100° C., and most preferably about 150° C. The maximum difference corresponds to 400° C. Since the various natural materials may be used for the body 42, as described above, the fine feldspathic earthenware 40 cannot be manufactured with high stability in terms of its microstructure, if the difference in the refractoriness between the formed body 52 and the mineral components of the slurry for the vitrified layer 48 is smaller than a value corresponding to 50° C. If the difference is larger than a value corresponding to 400° C., on the other hand, the kind of the glaze that can be used for the glaze layer 46 is limited, and the properties of the fine feldspathic earthenware 40 are deteriorated due to a relatively large difference in property between the body 42 and the glaze. The refractoriness of the mineral components for the vitrified layer 48 is required to be held within a range of SK06a–27, preferably within a range of SK2a–20, and more preferably within a range of SK6a–17.

In view of the cost of manufacture of the fine feldspathic earthenware 40, the adhesiveness of the vitrified layer 48 and ease of coating of the composition for the vitrified layer 48, a single natural material may be used for the composition. For example, the single natural material may be selected from among: Furious clay available in Aichi prefecture (Japan); Murakami clay including Seri cite as a major component and available in Niigata prefecture (Japan); Amakusa pottery stone available in Nagasaki prefecture (Japan); Tsushima stone; Izumiyama pottery stone available in Saga prefecture (Japan); Obara pottery stone available in Shimane prefecture (Japan); Izushi pottery stone available in Hyogo prefecture (Japan); and Hattori pottery stone available in Ishikawa prefecture (Japan). May other known single natural materials such as clay, pottery stone and mica exhibiting a high degree of adhesiveness may be used. Further, the composition including a major natural mineral component or components as described above may further include a powdered pottery material such as clay, kaoline and pottery stone, which has a higher degree of refractoriness than the major natural mineral component(s).

The formed body 52 with its precursor 53 coated with the composition for the vitrified layer 48 in the coating step P7 is then biscuit-fired in the biscuit-firing step P8. FIG. 7C shows an example of the biscuit-firing step P8, wherein a plurality of pieces of the formed body 52 are positioned relative to each other in a stack such that the adjacent pieces are spaced apart from each other by refractory spacer setters 56. Each of the spacer setters 56 has an outside diameter of about 70 mm and a height of about 10 mm. The stack of the superposed pieces of the formed body 52 is placed on a refractory bottom setter 58. In this condition, the pieces are biscuit-fired. In the present example wherein each piece of the formed body 52 is formed into the fine feldspathic earthenware 40 (a kind of a fine earthenware), the formed body 52 is biscuit-fired at a temperature within a range of 1100–1300° C. (corresponding to SK1a–10). In glost-firing step P13 (which will be described), the glaze is fired at a temperature within a range of 900–1100° C. (corresponding to SK010a–1a). Thus, the glost-firing temperature is lower than the biscuit-firing temperature by about 150° C.

As described above, the refractoriness of the body 42 is generally within a range of about 1350–1630° C. (corresponding to SK20–28). If the formed body 52 is fired at a temperature close to the lower limit of the above-indicated range, the obtained body 42 has water absorption percentage of about 15%. In this case, the biscuit-fired body 42 has a higher mechanical strength and permits easier handling in the subsequent processing, than a body formed at an ordinary biscuit-firing temperature. If the formed body 52 is fired at a temperature close to the upper limit of the above-indicted range, the obtained body 42 has water absorption percentage of about 5%, and has a higher degree of sintering. The water absorption percentage of the body 42 largely depends upon the mineral composition of the starting material, the proportion of the components of the composition, and the particle size of the starting material.

The body 42 obtained by biscuit-firing the formed body 52 in the biscuit-firing step P8 is then subjected to underglaze decoration step P9, in which an underglaze decoration is directly drawn on the surfaces of the body 42, with an inorganic pigment, by using a brush or a stamp. Where the underglaze decoration is relatively complicated, a transfer paper carrying the underglaze decoration is bonded to the surfaces of the body 42. Where the transfer paper is used, the underglaze decoration step P9 is followed by calcining step P10, in which the body 42 is calcined at a temperature of about 700° C. in the presence of an amount of air sufficient to burn out inorganic substances contained in the transfer paper.

The body 42 with the underglaze decoration given thereon in the underglaze decoration step P9 is coated with a glaze for the glaze layer 46, in glaze coating step P11. FIG. 7D shows this glaze coating step P11. Since the glaze is usually in the form of a slurry, and since the body 42 has water absorption percentage of 3–15%, it is difficult to coat the body 42 with the glaze, by immersing the body 42 in the slurry. In the specific example of FIG. 7D, the body 42 is placed on a support 60, heated by a gas burner, and is coated with the glaze with a spray gun or sprayer 62 while the body 42 is kept rotated. In this glaze coating operation, the annular bottom 44 is held in direct contact with the support 60, so that an almost entire surface of the annular bottom 44 is substantially prevented from being coated with the glaze.

The body 42 coated with the glaze in the glaze coating step P11 is then subjected to wiping step P12, in which the glaze more or less applied to the surface of the annular bottom 44 is wiped off. FIG. 7E shows this wiping step P12. In the wiping step P12, the glaze is removed from the annular bottom 44, by a sponge 64. Preferably, the glaze is removed from the annular bottom 44 such that only the radially inner and outer end portions 48a, 48b (FIG. 5) of the semicircular surface of the annular vitrified layer 48 formed in the following glost-firing step P13 are covered with the glaze layer 46. That is, an almost entire area of the semicircular surface of the annular vitrified layer 48, except the radially inner and outer end portions 48a, 48b, is exposed to the atmosphere and is not covered by the glaze layer 46.

The wiping step P12 to remove the glaze from the annular bottom 44 of the body 42 is followed by the glost-firing step P13 in which the body 42 is glost-fired so that the glaze layer 46 is formed on the surfaces of the body 42. FIG. 7F shows this glost-firing step P13. The body 42 is glost-fired at a temperature within a range of about 980–1160° C., while the body 42 placed on a setter 66 is held in a sagger (not shown). Although the annular bottom 44 of the body 42 is held in direct contact with the setter 66 during the glost-firing operation, the vitrified layer 48 formed so as to cover the annular bottom 44 is not fused to the setter 66 and can be easily separated from the setter 66, since the refractoriness of the vitrified layer 48 is high enough to prevent the fusion of the vitrified layer 48 at the glost-firing temperature.

The body 42 coated with the glaze layer 46 in the glost-firing step P13 is then finished in finishing step P14. FIG. 7G shows this finishing step P14. While the glaze was wiped off from the annular bottom portion 44 in the wiping step P12, the glaze may more or less remain on the annular bottom 44, except at the radially inner and outer end portions 48a, 48b. Further, some fragments of the setter 66 may adhere to the body 42. In view of these possibilities, the annular bottom 44 of the body 42 is slightly ground and finish-shaped, with a grinding wheel 68 having an abrasive such as silicon carbide or diamond. Thus, the fine feldspathic earthenware 40 is manufactured.

EXAMPLE

There will be described an experiment conducted by the present inventors to confirm advantages of the present invention. In the experiment, a body 70 of a fine feldspathic earthenware according to the present invention, and a body 80 of a prior art fine feldspathic earthenware as a comparative example were manufactured. These bodies 70, 80 have respective annular bottoms 72, 82. To detect the water absorbing property of the annular bottoms 72, 82, annular surface areas of the bodies 70, 80 which include the annular bottoms 72, 82 were coated with an aqueous solution of an organic dye.

The bodies 70, 80 of the fine feldspathic earthenware were manufactured in the following manner. Initially, pottery stone, feldspar, siliceous stone and plastic clay were ground into fine powders having suitable particle sizes these materials were measured, so that a composition consisting of about 57% by weight of pottery stone, about 8% by weight of feldspar, about 10% by weight of siliceous stone and about 25% by weight of plastic clay was introduced into a porcelain pot mill, together with a small amount of a deflocculant in the form of a water glass. These materials in the pot mill were ground and mixed for about 24 hours. Grinding balls and water were used in the pot mill to obtain a slurry of the materials having an average particle size of about 6 μm. The content of the pot mill consisted of one part by weight of the materials, one part by weight of the grinding balls and one part by weight of water. The thus prepared slurry was dewatered or dehydrated so that the slurry had a water content of about 30%. The thus adjusted slurry was poured into a gypsum mold whose cavity corresponds to a dish having an annular bottom. After the slurry was sufficiently solidified in close contact with the wall of the mold cavity, a formed mass was removed from the gypsum mold. After the formed mass was sufficiently dried, the surface of the annular portion of the formed mass were coated with a thin layer of a slurry of a sericite (fine particles of sericite having an average size of 4 μm uniformly dispersed in water). The coating operation was effected with a brush. The sericite was a mixture consisting of about 71% by weight of $SiO_2$, about 14% by weight of $Al_2O_3$, about 3.3% by weight of MgO, a total of about 4.1% by weight of $Na_2O$ and $K_2O$, and about 5.6% by weight of IgLoss. Then, the formed mass was biscuit-fired in a tunnel kiln, for a total time of 40 hours during which the formed mass was held at the highest temperature of about 1200° C. (SK6a) for two hours. The thus biscuit-fired body 70 exhibited a relatively low degree of glossiness or brightness, which indicated that the biscuit-fired body was not vitrified, except at the annular bottom 72. The body 70 had water absorption percentage of about 8%, and an average coefficient of thermal expansion of about $6 \times 10^{-6}$. Unlike the body 70, however, the surface of the annular bottom 72 exhibited a considerably high degree of glossiness or brightness, which indicated a satisfactorily high degree of vitrification on the surface of the annular bottom 72, that is, formation of a vitrified layer covering the annular bottom 72.

Figure 8A:
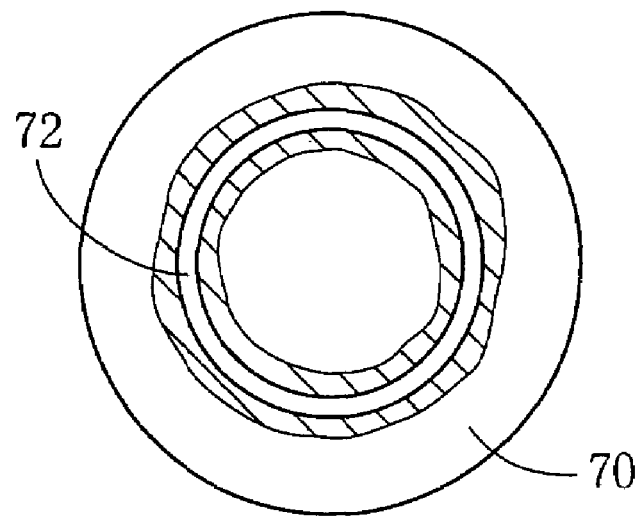
FIGS. 8A and 8B are bottom plan views wherein hatched areas indicate portions of fine feldspathic earthenwares on which an organic dye remains after washing the earthenwares which have been coated at the annular bottom and its vicinity with an aqueous solution of the organic dye, FIG. 8A showing the body of the earthenware according to the embodiment of the invention, while FIG. 8B showing the body of the earthenware of the prior art.
Figure 8B:
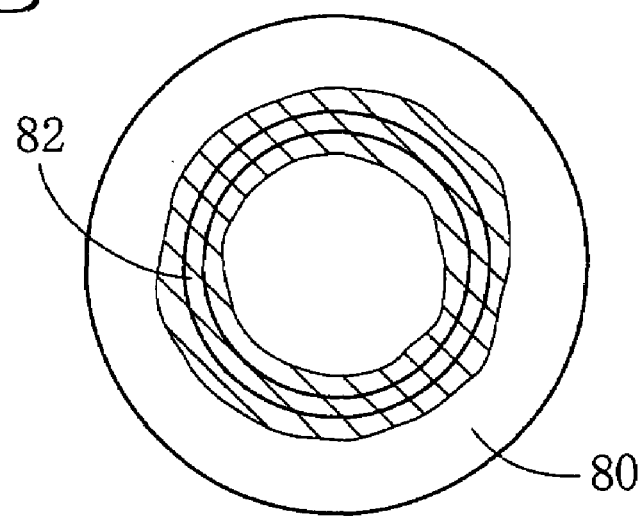

The body 80 was obtained in the same manner as described above with respect to the body 70, except in that the surface of the annular bottom 82 was not coated with the slurry indicated above. An annular surface area of each of the biscuit-formed bodies 70, 80, which area includes the annular bottom 72, 82, was coated with an aqueous solution of rhodamine B (2% concentration), with a brush. This coating was repeated a few times. The aqueous solution of rhodamine B may be replaced by an aqueous solution of an organic dye such as methyl red, methylene blue, or congo red. Then, the annular surface areas coated with the solution were washed with a flush of water. FIGS. 8A and 8B are bottom plan views in which hatched areas indicate the areas in which the dye remained on the bodies 70, 80, respectively. In the body 80 of the known fine feldspathic earthenware, the annular surface area coated with the solution, which includes the annular surface of the annular bottom 82, was entirely dyed. In the body 70 of the fine feldspathic earthenware according to the present invention, the dye was removed from the annular surface of the annular bottom 72, as a result of the washing with the water. This indicated that the vitrified layer covering the annular bottom 72 had substantially no water absorbing property, and was highly resistant to permeation of contaminated liquids or particulate matters into the body 70 through the annular bottom 72.

Then, the surfaces of the body 70 except the annular surface of the annular bottom 72 was coated with a glaze, with a spray gun, while the body 70 was held at an elevated temperature. The glaze was a mixture consisting of about 38% by weight of $SiO_2$, about 5% by weight of $Al_2O_3$, a total of about 10% by weight of $Na_2O$ and $K_2O$, and a total of about 4% by weight of CaO, MgO and BaO, and 43% by weight of PbO. Then, the glaze was removed from the annular bottom 72, and the body 70 was introduced into a refractory sagger, such that the annular bottom 72 was held in contact with a support. In the sagger, the body 70 was glost-fired at 1040° C. (corresponding to SK03a). A small amount of a refractory material remaining on the annular bottom 72 after the glost-firing of the body 70 was removed by a grinding operation with a grindstone. The same aqueous solution of the organic dye as used after the biscuit-firing operation was applied to the annular surface area of the body 70 including the annular surface of the annular bottom 72, and the water absorbing property of the body 70 was inspected. The inspection revealed that the aqueous solution did not permeate at all through the glaze layer or the vitrified layer covering the annular bottom 72.

In the present embodiment, the composition having a lower degree of refractoriness than the body 42 was applied to the formed body 52, so as to cover the annular portion (precursor 53 of the annular bottom 44), in the coating step P7, and the formed body 52 was biscuit-fired into the body 42 in the biscuit-firing step P8, so that the annular bottom 48 of the body 42 was covered with the vitrified layer 48. The vitrified layer 48 was not coated with the glaze layer 46, so that the body 42 could be coated with the glaze layer 46 while the annular bottom 48 of the body 42 was held in direct contact with the support 60. Accordingly, the formed body 52 was not required to be supported with pins, and the annular bottom 44 was not fused to the refractory setter 66 when the body 42 was glost-fired with the annular bottom 44 held in direct contact with the setter 66, in the glost-firing step P13. Therefore, the body 42 was not required to be supported with a jig, at the glaze layer 46, when the body 42 was glost-fired. Accordingly, the body 42 did not have any non-glazed surface areas which would be caused if the pins or jig were used to support the body 52, 42. Since the vitrified layer 48 had substantially no water absorbing property, the body 42 did not absorb contaminated liquids or particulate matters through the vitrified layer 48. Thus, the fine feldspathic earthenware 40 manufactured according to the present invention has the body 42 which has a high water absorption percentage but does not have exposed surface areas through which contaminated liquids or particulate matters are easily absorbed Further, the annular vitrified layer 48 is covered, at its radially inner and outer end portions 48a, 48b, with the glaze layer 46, so that the exposure of the annular bottom 44 (body 42) to the atmosphere is completely prevented.

In addition, the vitrified layer 48 is formed of a composition the refractoriness of which is lower than that of the body 42, so that the vitrified layer 48 formed by biscuit-firing of the body 42 has substantially no water absorbing property. Thus, the vitrified layer 48 which does not have a water absorbing property is formed when the body 42 is biscuit-fired.

Further, the composition for the vitrified layer 48 is formed of the composition including components that are vitrified at a biscuit-firing temperature within a range of 1100–1300° C., so that these components are vitrified when the body 42 is biscuit-fired in the biscuit-firing step P8, but are not fused to the setter 66 when the body 42 is subsequently glost-fired at a glost-firing temperature lower than the biscuit-firing temperature. Namely, the vitrified layer 48 has a refractoriness high enough to prevent its fusion at the glost-firing temperature.

The vitrified layer 48 has a thickness of 1 μm–0.5 mm, which permits the vitrified layer 48 to perform the intended function, without a problem with the fine feldspathic earthenware 40.

The body 42 and the vitrified layer 48 has a difference in the average coefficient of thermal expansion, which is held within a range of $\pm 3 \times 10^{-6}$ in which the residual stress due to the difference in the average coefficient of thermal expansion between the body 42 and the vitrified layer 48 can be held at a sufficiently reduced amount. Accordingly, the risk of peeling or cracking of the vitrified layer 48 due to the residual stress can be minimized.

The fine feldspathic earthenware 40 can be suitably used as a tableware, which does not absorb liquids or particulate matters through any portion of the body 42, irrespective of a water absorbing property of the body 42 per se, since the body 42 is not directly exposed to the atmosphere.

In the biscuit-firing step P8, a plurality of pieces of the formed body 52 are biscuit-fired while the pieces positioned in a stack are spaced apart from each other by the refractory setters 56, so that the precursors 53 of the pieces of the formed body 52, which have been coated with the composition for the vitrified layer 48, are not in direct contact with the spacer settings 56. This arrangement permits concurrent biscuit-firing of the plurality of pieces of the formed body 52.

While the preferred embodiment of the present invention has been described above in detail by reference to the drawings, for illustrative purpose only, it is to be understood that the invention is not limited to the details of the illustrated embodiment, but may be otherwise embodied.

While the pottery 40 manufactured in the illustrated embodiment is referred to as a fine feldspathic earthenware, the principle of the present invention is equally applicable to a semi-vitrified earthenware (semi-vitreous china or fine earthenware) the body of which is partly sintered and has water absorption percentage of about 3–5%.

Although the fine feldspathic earthenware 40 in the illustrated embodiment has a tableware in the form of a dish having a comparatively small depth, the shape of the fine feldspathic earthenware is not limited, and the principle of this invention is equally applicable to a fine feldspathic earthenware of any shape, such as a tea cup, a coffee cup and a small bowl.

While the fine feldspathic earthenware 40 has a circular shape in the plan view of FIG. 4, the principle of the invention is equally applicable to a fine feldspathic earthenware having any other shape in the plan view, such as an elliptical shape and a rectangular shape, as long as the earthenware has an annular bottom formed on its back surface.

In the illustrated embodiment, the annular bottom 44 of the fine feldspathic earthenware 40 has a truly circular shape in the plan view of FIG. 4. However, the term "annular" used herein is interpreted to mean not only a circular shape, but also an elliptical shape and a rectangular shape, and even a substantially "annular" shape, which includes a generally annular shape defined by a plurality of substantially arcuate parts which are spaced apart from each other in a circumferential direction of a circular, elliptical or rectangular earthenware.

In the illustrated embodiment, the coating step P7 precedes the biscuit-firing step P8. However, the surface of the annular bottom 44 of the biscuit-fired body 42 may be coated with the composition for the vitrified layer 48, after the biscuit-firing step P8, provided that the vitrified layer 48 can be formed as needed, in the glost-firing step P13. In this case, the glost-firing operation in the step P13 serves as a firing operation to form the vitrified layer 48.

It is to be understood that the present invention may be embodied with various other changes, modifications and improvements, which may occur to those skilled in the art, without departing from the spirit and scope of the invention defined in the appended claims.

What is claimed is:

1. A fine feldspathic earthenware comprising a body and a glaze layer covering surfaces of said body, said body having water absorption percentage of not lower than 3% and lower than 15% and including an annular bottom formed on a bottom portion of the body, wherein an improvement comprises:

said glaze layer being absent on a surface of said annular bottom;

said surface of said annular bottom being covered with an annular vitrified layer which has substantially no water absorbing property;

said annular vitrified layer being formed of a composition that has a lower degree of refractoriness than said body and a higher degree of refractoriness than said glaze layer; and said composition being vitrified when said body is biscuit-fired, and said composition not being fused when said body is glost-fired.

2. A fine feldspathic earthenware according to claim 1, wherein said annular vitrified layer has a radially inner end portion and a radially outer end portion which are covered with said glaze layer.

3. A fine feldspathic earthenware according to claim 1, wherein said composition comprises a component that is vitrified at a temperature within a range of 1100–1300° C.

4. A fine feldspathic earthenware according to claim 1, wherein said annular vitrified layer has a thickness of not smaller than 1 μm and smaller than 0.5 μmm.

5. A fine feldspathic earthenware according to claim 1, wherein a difference between average coefficients of thermal expansion of said body and said annular vitrified layer is within a range of $\pm 3 \times 10^{-6}$.

6. A fine feldspathic earthenware according to claim 1, wherein said said composition comprises 45–80% by weight of $SiO_2$, 10–40% by weight of $Al_2O_3$, and a total of 3–15% by weight of $K_2O$ and $Na_2O$.

7. A fine feldspathic tableware comprising a body and a glaze layer covering surfaces of said body, said body having water absorption percentage of not lower than 3% and lower than 15% and including an annular bottom formed on a bottom portion of the body, wherein an improvement comprises:

said glaze layer being absent on a surface of said annular bottom;

said surface of said annular bottom being covered with an annular vitrified layer which has substantially no water absorbing property;

said annular vitrified layer being formed of a composition that has a lower degree of refractoriness than said body and a higher degree of refractoriness than said glaze layer; and said composition being vitrified when said body is biscuit-fired, and said composition not being fused when said body is glost-fired.

* * * * *